United States Patent
Rommelshausen

[11] 3,749,215
[45] July 31, 1973

[54] BLOCKING SYNCHRONIZING ARRANGEMENT FOR MOTOR VEHICLE-CHANGE-SPEED TRANSMISSIONS

[75] Inventor: Günter Wörner Rommelshausen, Rommelshausen, Germany

[73] Assignee: Daimler-Benz Aktiengesellschaft, Stuttgart-Unterturkheim, Germany

[22] Filed: Dec. 15, 1971

[21] Appl. No.: 208,375

[30] Foreign Application Priority Data
Dec. 15, 1970 Germany.................. P 20 61 619.7

[52] U.S. Cl............................................... 192/53 F
[51] Int. Cl............................................ F16d 23/06
[58] Field of Search................................... 192/53 F

[56] References Cited
UNITED STATES PATENTS
3,035,674    5/1962    Peras................................ 192/53 F
3,175,412    3/1965    Peras................................ 192/53 F Primary Examiner—Allan D. Herrmann
Attorney—Craig, Antonelli and Hill

[57] ABSTRACT

A blocking synchronization for motor vehicle change-speed transmissions in which an axially displaceable shifting sleeve cooperates with synchronizing rings that are also axially displaceable and rotatable within limits; the synchronizing rings, in their turn, cooperate by means of blocking surfaces with engaging teeth at the gear, whereby an annular spring guided in the synchronizing ring for producing at the synchronizing ring a force directed toward the shifting sleeve, cooperates with a cone surface at the gear, which cone surface has a considerably steeper inclination in its portion directed toward the shifting sleeve.

6 Claims, 3 Drawing Figures

PATENTED JUL 31 1973 3,749,215

BLOCKING SYNCHRONIZING ARRANGEMENT FOR MOTOR VEHICLE-CHANGE-SPEED TRANSMISSIONS

The present invention relates to a blocking synchronization for motor vehicle change-speed transmissions, in which an axially displaceable shifting sleeve cooperates with synchronizing rings also axially displaceable and limitedly rotatable, which in their turn cooperate by means of blocking surfaces with the engaging teeth at the gear, and in which an annular spring guided in each synchronizing ring for the production of a force at the synchronizing ring directed toward the shifting sleeve cooperates with a cone surface at the gear.

In blocking synchronizations of the aforementioned type, there exists the desire to produce a friction force at the synchronizing ring, during the beginning of the shifting sleeve movements which is as large as possible, i.e., as large as possible an abutment force of the synchronizing ring at the shifting sleeve. This is necessary for the reason to attain an immediate shifting of the synchronizing ring into its blocking position and to prevent thereby with certainty a tearing-through of the shifting sleeve without prior synchronization.

The present invention is concerned with the task to provide a solution to the described problem. As solution to the underlying problems, the present invention is predicated on the general concept to locate in front of the cone surface a threshold, so to speak of, with increased resistance effect. In particular, the present invention proposes in connection therewith that this cone surface has a considerably steeper inclination at its portion directed toward the shifting sleeve.

The construction according to the present invention offers the advantage that during a movement of the shifting sleeve in the engaging direction, the corresponding synchronizing ring initially is practically held fast and is caused to abut with its friction surface at the shifting sleeve with a large force. The synchronizing ring is thereby taken along immediately in the direction of rotation and shifts into its blocking position whereby the shifting sleeve is prevented with certainty from an unintentional passing-through into the engaging position.

Exhaustive tests with the construction of the present invention have demonstrated that the point or apex angle of the steeper portion of the cone surface should be about three times as large as that of the flatter portion.

Synchronization installations of the aforementioned type exist in the prior art, having an abutment arranged at the gear part for the ring spring in the center position of the shifting sleeve. For such types of arrangements, the present invention further proposes that the cone surface terminates in the direction toward the shifting sleeve in an annular groove, whose raised and very steep flank disposed in the direction toward the shifting sleeve forms the abutment whereas the flank passing over into the cone surface forms the steep portion of the cone surface.

Accordingly, it is an object of the present invention to provide a blocking synchronization for motor vehicle change-speed transmissions which avoids by simple means the aforementioned shortcomings and drawbacks encountered in the prior art.

Another object of the present invention resides in a blocking synchronization for motor vehicle change-speed transmissions in which a relatively large friction force is produced at the synchronizing ring during the beginning of the shifting sleeve movement.

A further object of the present invention resides in a blocking synchronization for motor vehicle change-speed transmissions which assures an instantaneous shifting of the synchronizing ring into the blocking position and thus prevents damage to the shifting sleeve or other parts of the synchronizing mechanism due to the premature movement of the shifting sheeve prior to synchronization.

These and other objects, features and advantages of the present invention will become more apparent from the following description when taken in connection with the accompanying drawing which shows, for purposes of illustration only, one embodiment of the present invention, and wherein.

Figure 1:
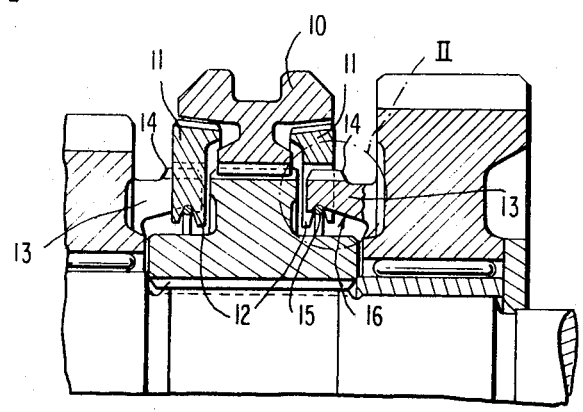
FIG. 1 is a partial longitudinal axial cross-sectional view through a blocking synhronization in accordance with the present invention.

Referring now to the drawing, wherein like reference numerals are used throughout the two views to designate like parts, and more particularly to FIG. 1, the shifting sleeve 10 illustrated in this figure cooperates with two synchronizing rings 11 which engage with radially inwardly directed extensions 12 (FIGS. 1 and 2) in corresponding apertures or cut-outs (not shown) of a gear rim 13 which is formed at or secured on the gear body. The gear rim 13 carries the engaging teeth 14. One ring spring 15 is arranged in the extensions 12 of each synchronizing ring 11, which cooperates with a cone surface generally designated by reference numeral 16 and provided at the gear rim 13 and which produces a force at the synchronizing ring 11 directed toward the shifting sleeve 10.

Figure 2:
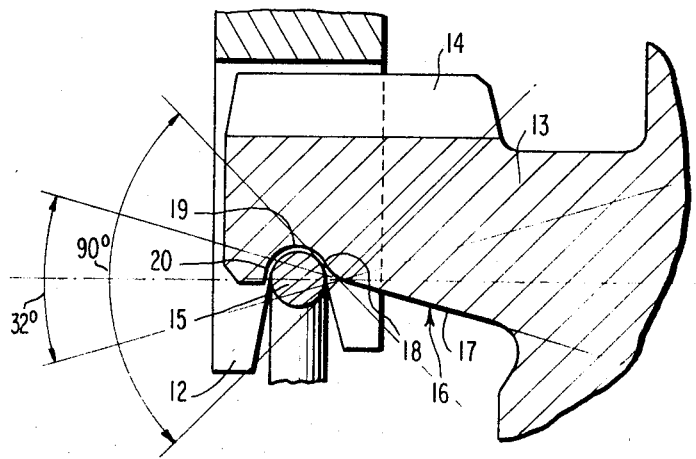
FIG. 2 is a partial cross-sectional view, on an enlarged scale, illustrating the details encircled in dash and dot lines in FIG. 1 and designated by reference numeral II.

According to FIG. 2, the cone surface 16 consists of a flatter second portion 17 and of a considerably steeper first portion 18 which is directed toward the shifting sleeve 10 and which passes over into a groove 19 for receiving the annular spring 15. The flank 20 of the groove 19 which is disposed on the side facing the shifting sleeve 10, is raised with respect to the ring spring 15 and has a considerably steeper inclination so that it can serve as abutment for the ring spring 15 and therewith for the synchronizing ring 11 in the center position of the shifting sleeve 10. As shown in FIG. 2, the inclination of the flank 18 — which is disposed as a threshold, so to speak of, between the groove 19 and the flatter part 17 of the cone surface 16, properly speaking — is inclined considerably more steeply than the portion 17. The latter, if completed into a full cone, would produce, for example, an apex angle of about 32°. If one completes the steeper portion 18 into a full cone, then an apex angle of about 90° would result, i.e., it amounts approximately to three times the apex angle at the flatter portion 17.

Figure 3:
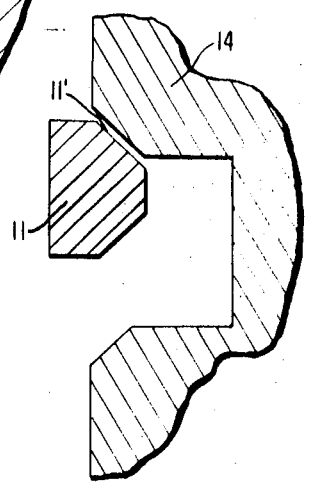
FIG. 3 is a schematic partial longitudinal axial cross-sectional view, on an enlarged scale, and illustrating details of the blocking surface and engaging teeth.

During the movement of the shifting sleeve 10 in the engaging direction at first the ring spring 15 abuts against the steeper portion 18 of the cone surface 16, i.e., a very large abutment force of the synchronizing ring 11 at the shifting sleeve 10 is produced thereat. The synchronizing ring 11 thereby shifts immediately into its blocking position whereby the blocking surface 11' (FIG. 3) of conventional construction become effective and prevent a passing-through of the shifting sleeve 10 into the engaging position until synchronism is realized. During this operation, the ring spring 15 remains on the steeper portion 18 of the cone surface 16. Only with synchronism and upon further axial pressure on the shifting sleeve 10, the ring spring 15 can pass over onto the flatter portion 17 of the cone surface 16 whereby exclusively the normal abutment force between synchronizing ring 11 and shifting sleeve continues to be produced from then on.

While I have shown and described only one embodiment according to the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A blocking synchronization for use with motor vehicle change-speed gears and the like comprising:
a gear wheel rotatable about a gear wheel axis,
engaging teeth means on said gear wheel,
a shifting sleeve axially displaceable along said axis,
synchronizing ring means interposed between said gear wheel and shifting sleeve, said synchronizing ring means being engageable with said shifting sleeve for displacement along said axis in response to axial displacement of said shifting sleeve, said synchronizing ring means including blocking surface means engageable with said engaging teeth means to transmit rotational forces between said synchronizing ring means and said gear wheel,
and a ring spring guided in said synchronizing ring means for engagement with cone surface means provided on said gear wheel for producing a force directed toward the shifting sleeve in response to movement of said shifting sleeve and synchronizing ring means toward said gear wheel,
wherein the cone surface means includes first and second portions of different inclinations with said first portion being nearer the shifting sleeve than the second portion, and wherein said first portion is provided with a considerably steeper inclination than said second portion.

2. A blocking synchronization according to claim 1, characterized in that the apex cone angle of the first portion is about three times as large as that of the second portion.

3. A blocking synchronization according to claim 2 further comprising an abutment arranged at the gear wheel for the ring spring when the shifting sleeve is in a central position away from said gear wheel, characterized in that the cone surface means terminates in the direction toward the shifting sleeve in an annular groove having a raised and very steep flank disposed in the direction toward the shifting sleeve which forms said abutment whereas an opposite flank of the annular groove passes over into the cone surface means to form the first portion of the cone surface means.

4. A blocking synchronization according to claim 3, further comprising a second gear wheel and associated synchronizing ring means and ring spring arranged at the side of said shifting sleeve opposite said abovementioned gear wheel and similar to said abovementioned gear wheel, synchronizing ring means and ring spring.

5. A blocking synchronization according to claim 1, further comprising an abutment arranged at the gear wheel for the ring spring when the shifting sleeve is in a central position away from said gear wheel, characterized in that the cone surface means terminates in the direction toward the shifting sleeve in an annular groove having a raised and very steep flank disposed in the direction toward the shifting sleeve which forms said abutment whereas an opposite flank of the annular groove passes over into the cone surface means to form the first portion of the cone surface means.

6. A blocking synchronization according to claim 1, further comprising a second gear wheel and associated synchronizing ring means and ring spring arranged at the side of said shifting sleeve opposite said abovementioned gear wheel and similar to said abovementioned gear wheel, synchronizing ring means and ring spring.

* * * * *